United States Patent Office 3,503,983
Patented Mar. 31, 1970

3,503,983
3-BENZHYDRYL-AZACYCLOALKANES
Renat Herbert Mizzoni, Long Valley, and Robert Paul Mull, Florham Park, N.J., assignors to Ciba Corporation, New York, N.Y., a corporation of Delaware
No Drawing. Continuation-in-part of application Ser. No. 392,930, Aug. 28, 1964. This application Feb. 10, 1967, Ser. No. 615,055
Int. Cl. C07d 27/04, 29/28
U.S. Cl. 260—293          6 Claims

ABSTRACT OF THE DISCLOSURE

New 3-benzhydryl-azacycloalkanes of the Formula I

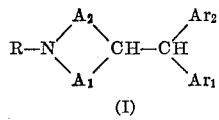

(I)

R=H, alkyl or aralkyl
$A_1$=n,n-alkylene (alkylidene)
$A_2$=alkylene with 2–3 ring-C
$Ar_{1,2}$=carbocyclic aryl the N-oxide, quaternaries and acid addition salts thereof, particularly the 3-[di-(4-diethylaminophenyl)-methyl]-piperidine trihydrochloride, are useful diuretics.

CROSS-REFERENCES

This is a continuation-in-part of application Ser. No. 392,930, filled Aug. 28, 1964, now abandoned.

SUMMARY

The present invention concerns and has for its object the provision of new 3-benzhydryl-azacycloalkanes, more particularly those of Formula I, in which R stands for hydrogen, lower alkyl or aralkyl, $A_1$ for n,n-lower alkylene, $A_2$ for lower alkylene separating the adjacent moieties by 2 to 3 carbon atoms and each of $Ar_1$ and $Ar_2$ for monocyclic carbocyclic aryl, both of which are substituted by lower alkyl, lower alkoxy, halogeno, trifluoromethyl or amino in the compounds in which R is hydrogen or lower alkyl, $A_1$ is methylene and $A_2$ 1,3-propylene, their N-oxide, quaternaries and acid addition salts of these compounds, as well as corresponding pharmaceutical compositions and methods for the preparation of the new compounds.

DESCRIPTION

The lower alkylene radicals $A_1$ and $A_2$ represent, for example, methylene, 1,1- or 1,2-ethylene, 1,1-, 1,2-, 2,2- or 1,3-propylene, 1,1-, 1,2-, 2,2-, 1,3- or 2,3-butylene, 3,3- or 2,4-pentylene, 1,3-, 3,3- or 2,4-hexylene or 3,5-heptylene respectively. $A_1$ preferably stands for methylene and $A_2$ for 1,2-ethylene or 1,3-propylene.

A lower alkyl group R is, for example, methyl, ethyl, n- or i-propyl, -butyl, -pentyl, -hexyl or -heptyl. A lower aralkyl group R is preferably monocyclic carbocyclic aryl-lower alkyl in which aryl substitutes any of the positions of the above exemplified lower alkyl groups, e.g. benzyl, 1- or 2-phenethyl, 1-, 2- or 3-phenyl-propyl or 2-phenyl-2-propyl.

The aryl radical $Ar_1$ and $Ar_2$ as well as that present in the lower aralkyl group R, preferably stands for phenyl or phenyl substituted by one or more than one lower alkyl, e.g. that mentioned above, lower alkoxy, e.g. methoxy, ethoxy, n- or i-propoxy or -butoxy, halogeno, e.g. fluoro, chloro or bromo, trifluoromethyl and/or amino, which latter preferably is substituted, such as lower alkylamino, di-lower alkylamino or lower alkyleneimino, e.g. methylamino, dimethylamino, ethylamino, diethylamino, ethyleneimino, n-propylamino, di-n-propylamino, n-butylamino, di-n-butylamino, pyrrolidino or piperidino. These aryl groups especially stand for phenyl, (lower alkyl)-phenyl, (lower alkoxy)-phenyl, (halogeno)-phenyl, (amino)-phenyl, (lower alkylamino)-phenyl, (di-lower alkylamino)-phenyl or (lower alkyleneimino)-phenyl.

The compounds of the invention have valuable pharmacological properties. Apart from gastric secretion inhibitory effects, they shown primarily diuretic, especially natri- and chloriuretic, activity and a lack of major kaliuretic effects, as can be demonstrated in animal tests, using mammals, such as rats or dogs, as test objects. The compounds of the invention are, therefore, useful diuretics as well as gastric secretion inhibitors in the treatment and management of edema and hypertension or gastirc irritation and ulcers respectively. Furthermore, they are valuable intermediates in the manufacture of other useful compounds, especially pharmacologically active products.

Particularly useful are compounds of the Formula I in which R stands for hydrogen or lower alkyl, $A_1$ for methylene, $A_2$ for 1,3-propylene and each of $Ar_1$ and $Ar_2$ stands for (amino)-phenyl, (lower alkylamino)-phenyl, (di-lower alkylamino)-phenyl and (lower alkyleneimino)-phenyl, and their therapeutically acceptable acid addition salts, especially the 3-[di(4-diethylaminophenyl)-methyl]-piperidine trihydrochloride, which, when given at an oral dose of 5 mg./kg./day to dogs shows outstanding diuretic activity combined with a decrease in the excretion of potassium.

Also particularly useful compounds are those of Formula I, in which R stands for hydrogen or lower alkyl, $A_1$ for methylene, $A_2$ for 1,3-propylene and each of $Ar_1$ and $Ar_2$ for (lower alkyl)-phenyl, (lower alkoxy)-phenyl, (halogeno)-phenyl and (trifluoromethyl)-phenyl and their therapeutically acceptable acid addition salts, especially the 3-[di-(4-methoxy- or fluoro-phenyl)-methyl]-piperidine hydrochloride, which, when given at an oral dose of 5 mg./kg./day to dogs show outstanding diuretic and natriuretic activity without causing an increase of potassium excretion.

Also outstanding diuretic activity have those compounds of Formula I, in which R stands for hydrogen or lower alkyl, $A_1$ for 1,1-lower alkylene, $A_2$ for 1,2-lower alkylene and each of $Ar_1$ and $Ar_2$ for phenyl, (lower alkyl)-phenyl, (lower alkoxy)-phenyl, (halogeno)-phenyl, (trifluoromethyl)-phenyl, (amino)-phenyl, (lower alkylamino)-phenyl, (di-lower alkylamino)-phenyl and (lower alkyleneimino)-phenyl and their therapeutically acceptable acid addition salts, especially the 3-benzhydrylpyrrolidine hydrochloride.

Further mention deserve the compounds of Formula I in which R stands for Ar-lower alkyl in which Ar is phenyl, (lower alkyl)-phenyl, (lower alkoxy)-phenyl, (halogeno)-phenyl, (tri-fluoromethyl)-phenyl, (amino)-phenyl, (lower alkylamino)-phenyl (di-lower alkylamino)-phenyl and (lower alkyleneimino)-phenyl, and $A_1$, $A_2$, $Ar_1$ and $Ar_2$ have the given meaning, and their therapeutically acceptable acid addition salts, especially the 1 - benzyl-3-benzhydroyl-piperidine hydrochloride, which, when given at an oral dosage range of about 1–15 mg./kg./day to dogs with a Pavlov pouch, show outstanding reduction in gastric secretion which is either induced by food or parenteral application of histamine.

The compounds of the invention are prepared by methods in themselves known. For example, the process for their preparation consists in hydrogenating a corresponding 1-R-3-benzhydryl-pyrrole, -pyridine or -pyridinium compound or a 1-R-3-$Ar_1$, $Ar_2$-methylidene-pyrrolidine or -piperidine compound and, if desired, converting any resulting compound into another compound of the invention.

The above hydrogenation is preferably carried out with catalytically activated or nascent hydrogen, e.g. hydrogen in the presence of platinum oxide or palladium-charcoal, or generated by the action of a light metal, e.g. an alkali metal, on an alcohol, or a heavy metal on an acid.

Any compound of Formula I obtained, in which R is hydrogen, may be substituted in 1-position, for example by reaction with a reactive ester of a lower alkanol or aralkanol, such as that of a hydrohalic or sulfonic acid, e.g. hydrochloric, hydrobromic, methane-, ethane-, benzene- or p-toluene-sulfonic acid. Any resulting tertiary amine may be converted into the corresponding N-oxide or quaternary ammonium salt, for example, by the action of hydrogen peroxide or a peracid, such as persulfuric, peracetic, perbenzoic or mono-perphthalic acid, or one of the above shown reactive esters of lower alkanols or aralkanols, respectively.

Resulting mixtures of isomers are separated into single isomers according to known methods. For example, resulting racemates are separated into the optically active forms with the use of optically active acids, such as d- or l-tartaric, malic, mandelic, 10-caphorsulfonic or quinic acid.

The above-mentioned reactions are carried out according to standard methods, in the presence or absence of diluents, preferably such as are inert to the reagents and are solvents thereof, of catalysts, condensing agents and/ or of inert atmospheres, at low temperatures, room temperature or elevated temperatures, at atmospheric or superatmospheric pressure. Condensing agents are preferably used in the reaction with a reactive ester whereby an acid is split off. They are especially inorganic or organic bases, for example, alkali metal carbonates, such as potassium carbonate, or tertiary nitrogen bases, such as trimethylamine or pyridine.

The compounds of the invention are obtained in the free form or in the form of their salts, depending on the conditions under which the process is carried out; the salts are also included in the present invention. Salts that are obtained can be converted into the free bases in known manner, for example, with alkalis or ion exchangers. Free bases that are obtained can be converted into salts by reaction with organic or inorganic acids, especially those that are suitable for the formation of therapeutically useful salts. Such acids are, for example, hydrohalic acids, e.g. hydrochloric or hydrobromic acid, sulfuric, phosphoric, nitric or perchloric acid, aliphatic, alicyclic, araliphatic, aromatic or heterocyclic carboxylic or sulfonic acids, for example, formic, acetic, propionic, succinic, glycollic, lactic, malic, citric, ascorbic, maleic, hydroxymaleic, pyroracemic, phenylacetic, benzoic, aminobenzoic, anthranilic, hydroxybenzoic, salicylic, aminosalicylic, embonic, nicotinic, methanesulfonic, ethanesulfonic, hydroxyethanesulfonic, ethylenesulfonic, halogenbenzenesulfonic, toluenesulfonic, naphthalene sulfonic and sulfanilic acid; methionine, tryptophan, lysine and arginine.

These or other salts of the new compounds, for example, the picrates, can also be used for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components may be used in the form of their salts. Mainly, those starting materials should be used in the reactions of the invention that lead to the formation of those compounds indicated above as being especially valuable.

The starting materials are known or, if they are new, are prepared by methods in themselves known, for example, by reacting a corresponding 1-R-3-pyrryl- or -pyridyl metal compound, e.g. a lithium or Grignard compound, with a corresponding benzophenone or reacting a 1-R-3-pyrryl- or -pyridyl-aldehyde with the compound $Ar_1$-H, advantageously in the presence of a strong acid, e.g. sulfuric acid, or reacting a 1-R-3-pyrrolidine or piperidine-carboxylic acid ester with an $Ar_1$-Grignard compound and dehydrating the resulting carbinol with an acid, and, if desired, quaternizing any resulting pyridine, for example, as shown above for the compounds of the invention.

The compounds of the invention can be used, for example, for the manufacture of pharmaceutical compositions containing them in conjunction or admixture with inorganic or organic, solid or liquid pharmaceutical excipients, suitable for enteral or parenteral administration. Suitable excipients are substances that do not react with the compounds of the invention, for example, water, gelatine, sugars, e.g. lactose, glucose or sucrose, starches, e.g. corn starch or arrowroot, stearic acid, or salts thereof, e.g. magnesium or calcium stearate, talc, vegetable fats or oils, gums, alginic acid, benzyl alcohols, glycols and other known excipients. The compositions may be, for example, in solid form as tablets, dragees or capsules, or in liquid form as solutions, suspensions or emulsions. They may be sterilized and/or contain adjuvants, such as preserving, stabilizing, wetting or emulsifying agents, solution promoters, salts for regulating the osmotic pressure and/or buffers. They may further contain other therapeutically valuable substances. Said pharmaceutical compositions are prepared by conventional methods and contain about 0.1 to 75%, more particularly 1 to 50%, of the active ingredient. They are also included within the scope of the present invention.

The following examples are intended to illustrate the invention and are not to be construed as being limitations thereon. Temperatures are given in degrees centigrade, and all parts wherever given are parts by weight.

EXAMPLE 1

A mixture of 13.5 g. of di-(4-methyl-phenyl)-3-pyridyl-methanol and 4.0 g. of platinum oxide in 200 ml. of a 4.5 N solution of hydrogen chloride in ethanol and 150 ml. of ethanol is treated with hydrogen at an initial pressure of about 3½ atmospheres. Within four hours the theoretical amount of hydrogen is absorbed; the catalyst is filtered off, and the filtrate is evaporated under reduced pressure. The residue is dissolved in hot water, the solution is made basic with a 50 percent solution of sodium hydroxide in water, and the organic material is extracted with ethyl acetate. The extract is evaporated under reduced pressure to yield the desired 3-[di-(4-methyl-phenyl)-methyl]-piperidine of the formula

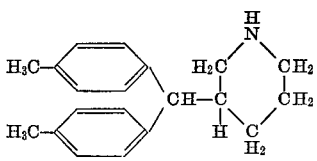

which is characterized by its hydrochloride salt.

The starting material used in the above procedure is prepared as follows: The solution of 68 ml. of a butyl lithium solution in hexane (14.9 g. per 100 ml.) in 50 ml. of anhydrous diethyl ether is chilled to −70° and treated with a solution of 15.8 g. of 3-bromo-pyridine in 75 ml. of anhydrous diethyl ether, which is added while stirring and over a period of thirty minutes. After stirring at −70° for fifteen minutes, a solution of 21.0 g. of 4,4'-dimethyl-benzophenone in 200 ml. of anhydrous diethyl ether is added dropwise over a period of two hours. Stirring is continued at −15° for two hours, and the reaction mixture is then decomposed by adding 100 ml. of water while stirring. The aqueous layer is extracted with chloroform; the combined organic solutions are dried, the solvent is removed and the residue is crystallized by trituration with petroleum ether. The resulting product represents the di-(4-methyl-phenyl)-3-pyridyl-methanol, which melts at 120–123° after recrystallization from a mixture of benzene and petroleum ether.

EXAMPLE 2

A solution of 15.7 g. of 3-[di-(4-chloro-phenyl)-methyl]-pyridine in 50 ml. of glacial acetic acid is treated with hydrogen and under a pressure of about 3.2 atmospheres and in the presence of 2.5 g. of platinum oxide while maintaining a temperature of 40°. The catalyst is filtered off, the filtrate is evaporated and the desired 3-[di-(4-chloro-phenyl)-methyl]-piperidine of the formula

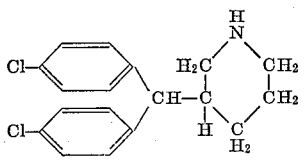

is purified by distillation and collected at 170°/0.23 mm.; yield: 14.0 g. Its hydrochloride salt, M.P. 97–100°, is prepared by treatment with a solution of hydrogen chloride in ethanol.

The starting material used in the above procedure is prepared as follows: A solution of 21.4 g. of 3-pyridine carboxaldehyde in 50 ml. of chlorobenzene is added dropwise to a dispersion of 40 ml. of concentrated sulfuric acid and 30 ml. of chlorobenzene; during the addition, the temperature rises to 60–70°. After heating at 85° for twenty hours, while stirring, the reaction mixture is cooled, poured onto ice and neutralized with sodium carbonate. The 3-[di-(4-chloro-phenyl)-methyl]-pyridine is extracted with chloroform, the organic solution is dried and concentrated and the residue is distilled; the desired product is collected at 194–196°/0.3 mm.; yield: 16.0 g.

EXAMPLE 3

A mixture of 12.8 g. of 3-[di-(4-methoxy-phenyl)-methyl]-pyridine hydrochloride in 150 ml. of anhydrous ethanol and 10 ml. of a 4.5 N solution of hydrogen chloride in ethanol containing 3.0 g. of platinum oxide is treated with hydrogen under a pressure of about 3.2 atmospheres and at room temperature. After seven hours, the hydrogenation is interrupted, the catalyst is filtered off, and the filtrate is evaporated under reduced pressure. The residue is dissolved in water, the aqueous solution is made basic with a 50 percent aqueous solution of sodium hydroxide, and extracted with ethyl acetate. The organic solution is dried over magnesium sulfate and evaporated to yield the oily 3-[di-(4-methoxy-phenyl)-methyl]-piperidine of the formula

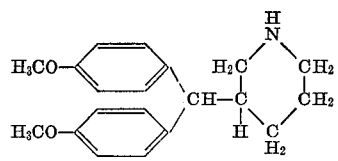

yield: 10.5 g. It is characterized as the hydrochloride.

EXAMPLE 4

A solution of 29.8 g. of 3-[di-(2-methoxy-phenyl)-hydroxymethyl]-pyridine in 250 ml. of acetic acid, containing 9.9 g. of a 10 percent palladium-on-charcoal catalyst, is treated with hydrogen at a pressure of about 3½ atmospheres and at a temperature of 80°. The catalyst is filtered off, the filtrate is evaporated under reduced pressure and the residue is taken up in water. The aqueous mixture is made basic with a 50 percent aqueous solution of sodium hydroxide; the organic material is extracted with ethyl acetate, the organic extract is dried and treated with a solution of hydrogen chloride in ethyl acetate to yield the 3-[di-(2-methoxy-phenyl) - methyl] - piperidine hydrochloride of the formula

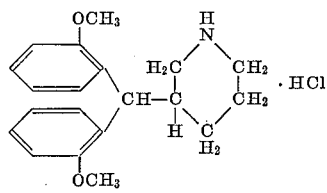

which is recrystallized from isopropanol, M.P. 237–240°; yield: 12.5 g.

The starting material used in the above procedure is prepared as follows: A solution of 65.4 g. of 2-bromoanisole in 100 ml. of dry tetrahydrofuran is carefully added to 9.8 g. of magnesium under an atmosphere of dry nitrogen. After refluxing for eight hours, the Grignard reagent is cooled and treated dropwise with a solution of 26.1 g. of ethyl nicotinate in 150 ml. of tetrahydrofuran. The reaction mixture is refluxed for four hours, then cooled in ice, treated with 200 ml. of water and filtered. The filtrate is extracted twice with methylene chloride, the organic extract is dried and evaporated, and the residue is dissolved in ethyl acetate. The organic solution is diluted with hexane, the solid material is filtered off, and the filtrate is evaporated to yield the 3-[di-(2-methoxy-phenyl)-hydroxymethyl]-pyridine, which is purified by distillation and collected at 190–195°/0.025 mm.; yield: 29.8 g.

EXAMPLE 5

A solution of 13.3 g. of 3-[di-(4-N,N-di-ethylamino-phenyl)-methyl]-pyridine hydrochloride in 100 ml. of ethanol, containing 0.75 g. of a platinum oxide catalyst and 1 ml. of 5 N ethanolic hydrogen chloride, is treated with hydorgen under a pressure of about 3 atmospheres. After completion of the reaction, the catalyst is filtered off, and the filtrate is treated with diethyl ether to yield an oily product, which is triturated with diethyl ether and redissolved in isopropanol. The solution is diluted with diethyl ether to yield the hygroscopic 3-[di-(4-N,N-di - ethylamino-phenyl)-methyl]-piperidine trihydrochloride of the formula

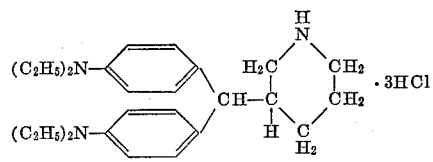

which melts as the monohydrate at 200° (with decomposition) after drying under reduced pressure; yield 9.5 g.

The starting material used in the above procedure is prepared as follows: A solution of 68 ml. of a 15.5 percent solution of butyl lithium in hexane is dissolved in 200 ml. of diethyl ether at −70° and treated over a period of fifteen minutes with 15.8 g. of 3-bromo-pyridine in 100 ml. of diethyl ether. After stirring for thirty minutes at −70°, a solution of 32.4 g. of 4,4′-di-N,N-diethyl-amino-benzophenone in 1,000 ml. of diethyl ether over a period of two hours. The reaction mixture is maintained at −10° to −20° for two hours and it is then diluted with 100 ml. of water and 50 ml. of a 25 percent aqueous solution of potassium hydroxide while shaking. The aqueous phase is extracted with methylene chloride; the combined organic solutions are washed with water, dried over magnesium sulfate and evaporated. The residue is dissolved in diethyl ether; the solution is treated with gaseous anhydrous hydrogen chloride to yield a solid material which is recrystallized from a mixture of isopropanol and diethyl ether and dried at low temperature to yield 38.0 g. of the hygroscopic 3-[di-(4-N,N-di-ethylamino-phenyl)-methyl]-pyridine hydrochloride having the following formula

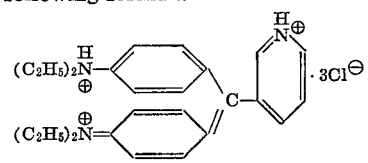

which is obtained in the form of the trihydrate.

EXAMPLE 6

A solution of 60.0 g. of 3-di-(4-fluoro-phenyl)-methyl-pyridine in 190 ml. of acetic acid, containing 10.7 g. of platinum oxide is treated with hydrogen at an initial pressure of about 3.2 atmospheres and at 40°. After about two hours, the reaction is interrupted, the catalyst is filtered off and the filtrate is concentrated under reduced pressure. The residue is dissolved in 50 ml. of water; the aqueous solution is made alkaline with a 40 percent aqueous solution of sodium hydroxide and extracted with diethyl ether. The organic extract is washed four times with water until neutral, dried over potassium carbonate and evaporated. The oily residue is distilled to yield 49.4 g. of 3-[di-(4-fluoro-phenyl)-methyl]-piperidine of the formula

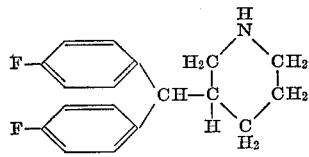

which is collected at 164°/0.9 mm., and re-distilled, B.P. 160°/0.5 mm. It is characterized as the hydrochloride.

The starting material used in the above procedure is prepared as follows: A mixture of 64.2 g. of pyridine 3-carboxaldehyde in 150 ml. of fluorobenzene is added dropwise to a dispersion of 90 ml. of concentrated sulfuric acid in 120 ml. of fluorobenzene. The temperature rises to 60–70° and is held at 85° for twenty hours while stirring. After cooling, the reaction mixture is poured onto ice; the aqueous mixture is neutralized with sodium carbonate and extracted with chloroform. The organic solution is dried over calcium sulfate, concentrated and evaporated to yield the 3-di-(4-fluoro-phenyl)-methyl-pyridine, which is distilled and collected at 160–164°/0.47 mm.; yield: 132.1 g.

Other compounds, which are prepared according to the previously-described procedure by selecting the appropriate starting materials are, for example 3-di-(2-methyl-phenyl)-methyl-piperidine, which is characterized as the hydrochloride salt and is obtained by treating 3-[di-(2-methyl-phenyl)-hydroxy-methyl]-pyridine with hydrogen in the presence of a palladium catalyst and acetic acid;

3-[(2-methyl-phenyl)-(4-methyl-phenyl)-methyl]-piperidine, which is characterized as the hydrochloride salt and prepared by reacting 3-[(2-methyl-phenyl)-(4-methyl-phenyl)-hydroxy-methyl]-pyridine with hydrogen in the presence of a palladium catalyst and acetic acid;

3-di-(3,4-dichloro-phenyl)-methyl-piperidine, which is characterized as the hydrochloride salt and is prepared by reacting 3-di-(3,4-dichloro-phenyl)-methyl-pyridine with hydrogen in the presence of platinum oxide and acetic acid;

3-di-(2,4-dimethoxy-phenyl)-methyl-piperidine, which is characterized as the hydrochloride salt and is prepared by reacting 3-di-(2-4-dimethoxy-phenyl)-methyl-pyridine hydrochloride with hydrogen in the presence of platinum oxide and ethanol;

3-di-(3,4-dimethoxy-phenyl)-methyl-piperidine, which is characterized as the hydrochloride salt and is prepared by reacting 3-di-(3,4-dimethoxy-phenyl)-methyl-pyridine hydrochloride with hydrogen in the presence of platinum;

3-di-(4-trifluoromethyl-phenyl)-methyl-piperidine, which is characterized as the hydrochloride salt and is prepared by reacting 3-di-(4-trifluoromethylphenyl)-methyl-pyridine with hydrogen in the presence of platinum oxide and acetic acid.

EXAMPLE 7

A mixture of 11.4 g. of 3-diphenylmethylene-pyrrolidine hydrobromide and 0.5 g. of a platinum oxide catalyst in 150 ml. of anhydrous ethanol is treated with hydrogen under an initial pressure of three atmospheres. After the uptake of the theoretical amount of hydrogen, the catalyst is filtered off, the filtrate evaporated, and the residue is recrystallized from isopropanol to yield 8.9 g. of 3-benzhydryl-pyrrolidine hydrobromide of the formula

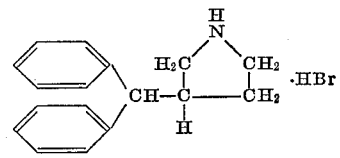

M.P. 225°.

It is dissolved in the minimal amount of water and the solution made basic with 50% aqueous sodium hydroxide. It is extracted with diethyl ether, the extract gassed with hydrogen chloride, the precipitate formed filtered off and recrystallized from isopropanol to yield the 3-benzhydryl-pyrrolidine hydrochloride monohydrate, M.P. 237–240°.

The starting material is prepared as follows: A solution of 260.2 g. of itaconic acid and 214.4 g. of benzylamine is refluxed for two hours, cooled and poured into ice-water while stirring. The solid material is filtered off, and dissolved in 400 ml. of a 5 N aqueous solution of potassium hydroxide; the solution is treated with a charcoal preparation and acidified with concentrated hydrochloric acid. The resulting 1-benzyl-pyrrolidin-2-one-4-carboxylic acid is filtered off, washed with water and dried under reduced pressure over phosphorous pentoxide, M.P. 139–141°; yield: 328 g.

A solution of 108.7 g. of 1-benzyl-pyrrolidin-2-one-4-carboxylic acid in 430 ml. of anhydrous ethanol is treated with 91.6 ml. of concentrated sulfuric acid. The resulting solution is refluxed for three hours and allowed to stand overnight; the excess of ethanol is evaporated under reduced pressure and the residue is poured onto ice. The mixture is neutralized with ammonium hydroxide and the organic material is extracted with methylene chloride. The organic extract is dried and concentrated, and the resulting ethyl 1-benzyl-pyrrolidin-2-one-4-carboxylate is purified by distillation and collected at 234–240°/15 mm.; yield: 102.2 g.

A solution of 110.2 g. of ethyl 1-benzyl-pyrrolidin-2-one-4-carboxylate in 60 ml. of tetrahydrofuran is slowly added to a suspension of 26.8 g. of lithium aluminum hydride in 366 ml. of tetrahydrofuran under an atmosphere of nitrogen; the rate of addition is regulated to maintain refluxing condition. Stirring and refluxing is continued for ten hours, and the reaction mixture is then treated with 80.5 ml. of ethyl acetate, 26.8 ml. of water, 53.6 ml. of a 15 percent aqueous solution of sodium hydroxide, and 80.5 ml. of water. The solid material is filtered off and extracted with ethanol in a soxhlet apparatus. The combined organic solutions are concentrated to dryness and the resulting 1-benzyl-3-hydroxymethyl - pyrrolidine is purified by distillation and collected at 173–175°/14 mm.; yield: 77 g.

A solution of 76.8 g. of 1-benzyl-3-hydroxymethyl-pyrrolidine in 442 ml. of 2 N sulfuric acid is added dropwise while stirring to a solution of 88.5 g. of chromium trioxide in 590 ml. of 2 N sulfuric acid. After standing overnight at room temperature, a barium hydroxide solution is added until the reaction mixture is basic; it is made neutral by adding solid carbon dioxide. The solid material is filtered off and washed with water, and the filtrate is concentrated to dryness. The residue is taken up in isopropanol and evaporated to dryness; this procedure is repeated with ethyl methyl ketone and the solid 1-benzyl-pyrrolidine-3-carboxylic acid is recrystallized from ethyl methyl ketone, M.P. 102–105°; yield: 58 g.

A solution of 47.8 g. of 1-benzyl-pyrrolidine-3-carboxylic acid and 43.0 g. of concentrated sulfuric acid in 392 ml. of anhydrous ethanol is refluxed for three hours while stirring. After standing overnight, the reaction mixture is concentrated under reduced pressure and the residue is poured on ice. The aqueous mixture is neutralized with ammonium hydroxide and extracted with methylene chloride. The organic solution is dried and concentrated to yield the ethyl 1-benzyl-pyrrolidine-3-carboxylate which is purified by distillation and collected at 118–120°/0.75 mm.; yield: 43.9 g.

A solution of 136.0 g. of bromo-benzene in 200 ml. of anhydrous diethyl ether is added to 20.2 g. of magnesium; the preparation of the Grignard reagent is complete after refluxing for one hour. It is cooled and treated dropwise with a solution of 32.6 g. of ethyl 1-benzyl-pyrrolidine-3-carboxylate in 100 ml. of anhydrous diethyl ether. The reaction mixture is refluxed for three hours while stirring, and is then decomposed by carefully adding water. The aqueous layer is separated and extracted with diethyl ether and with methylene chloride. The combined organic solutions are dried and concentrated under reduced pressure. The residue crystallizes on scratching to yield the 1-benzyl-3-(diphenyl - hydroxymethyl)-pyrrolidine, which melts at 98–99° after recrystallization from isopropanol; yield: 36.0 g.

A mixture of 41.5 g. of 1-benzyl-3-(diphenyl-hydroxymethyl)-pyrrolidine and 12.0 g. of 10 percent palladium-on-charcoal in 250 ml. of anhydrous ethanol is treated with hydrogen under an initial pressure of three atmospheres and at a temperature of 50°. After the theoretical uptake of hydrogen, the catalyst is filtered off, the filtrate is concentrated under reduced pressure and the residue is sublimated to yield 26.6 g. of 3-(diphenyl-hydroxymethyl)-pyrrolidine, M.P. 146°.

A solution of 14.9 g. of 3-(diphenyl-hydroxymethyl)-pyrrolidine in 200 ml. of 48% hydrobromic acid is stirred overnight at room temperature. The precipitate is filtered off and recrystallized from isopropanol to yield 11.4 g. of 3-diphenyl-methylene-pyrrolidine hydrobromide, M.P. 263–264°.

EXAMPLE 8

The mixture of 35.7 g. d,l-3-diphenylmethyl-piperidine, 26.8 g. benzyl bromide, 50.0 g. sodium carbonate, 400 ml. n-butanol and 4 drops of water is refluxed for 48 hours while stirring. It is filtered hot and the filtrate evaporated in vacuo. The residue is recrystallized from ethanol to yield 40.0 g. d,l-1-benzyl-3-diphenyl-piperidine of the formula

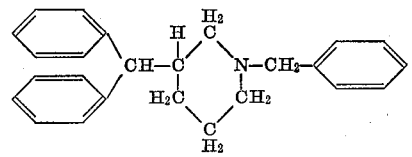

melting at 94–96°.

40.0 g. thereof are dissolved in 400 ml. hot acetone and to the solution 8.8 g. d-tartaric acid in 400 ml. hot acetone are added. The mixture is boiled for a few minutes whereupon preciptation occurs. It is allowed to stand at room temperature overnight and is then filtered to yield 24.3 g. d-1-benzyl - 3 - diphenyl - methyl - piperdine d-tartrate which melts, after recrystallization from acetone, at 137–139°; $[\alpha]_D^{25} = +7.18°$ (in water). [The mother liquor (A) contains the corresponding enantiomer and is worked up as described below.]

24.3 g. thereof are dissolved in the minimal amount of water, the solution is made basic with 40% aqueous sodium hydroxide and extracted 3 times with 75 ml. methylene chloride. The combined extracts are dried and evaporated in vacuo to yield the d-1-benzyl-3-diphenylmethyl-piperidine melting at 84–86°, after recrystallization from ethanol; $[\alpha]_D^{25} = -6.33°$ (in ethanol, c.=17.5).

The mother liquor (A) is concentrated in vacuo, the concentrate made basic with 40% aqueous sodium hydroxide and the mixture extracted 3 times with 75 ml. methylene chloride. The combined extracts are dried and evaporated in vacuo to yield 20.0 g. crude 1-1-benzyl-3-diphenylmethyl-piperidine.

20.0 g. thereof are dissolved in 250 ml. hot acetone and to the solution 4.4 g. l-tartaric acid in 250 ml. hot acetone are added. The mixture is boiled for a few minutes, whereupon a precipitate is formed. It is allowed to stand overnight at room temperature, whereupon it is filtered to yield 13.9 g. l-1-benzyl-3-diphenylmethyl-piperidine l-tartrate melting at 137–139° after recrystallization from acetone; $[\alpha]_D^{25} = -7.79°$ (in ethanol, c.=10).

13.9 g. thereof are dissolved in the minimal amount of water, the solution made basic with 40% aqueous sodium hydroxide, extracted 3 times with 75 ml. methylene chloride, the extract dried and evaporated in vacuo to yield the l-1-benzyl-3-diphenylmethyl-piperidine, melting at 84–86° after recrystallization from ethanol; $[\alpha]_D^{25} = +7.80°$ (in ethanol, c.=21.5).

What is claimed is:

1. A member selected from the group consisting of the compound having the formula

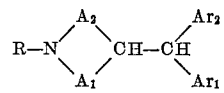

in which R is a member selected from the group consisting of hydrogen and lower alkyl, $A_1$ is methylene, $A_2$ is 1,3-propylene and each of $Ar_1$ and $Ar_2$ is a member selected from the group consisting of (amino)-phenyl, (lower alkylamino)-phenyl, di-lower alkylamino)-phenyl and (5 or 6 ring-membered alkyleneimino)-phenyl, and the therapeutically acceptable acid addition salts thereof.

2. A compound having the formula

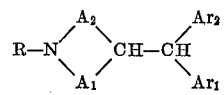

in which R is phenyl-lower alkyl, each of $Ar_1$ and $Ar_2$ is a member selected from the group consisting of phenyl (lower alkyl)-phenyl, (lower alkoxy)-phenyl, (fluoro)-phenyl, (chloro)-phenyl, (bromo)-phenyl, (trifluoromethyl)-phenyl, (amino)-phenyl, (lower alkylamino)-phenyl, (di-lower alkylamino)-phenyl and (lower alkyleneimino)-phenyl, $A_1$ is methylene and $A_2$ is 1,2-ethylene or a therapeutically acceptable acid addition salt thereof.

3. A compound as claimed in claim 2 and being a member selected from the group consisting of the 3-[di-(4-diethyl-aminophenyl)-methyl]-piperidine and a therapeutically acceptable acid addition salt thereof.

4. A compound as claimed in claim 5 and being a member selected from the group consisting of the 3-benzhydryl-pyrrolidine and a therapeutically acceptable acid addition salt thereof.

5. A member selected from the group consisting of the d-1-benzyl-3-benzhydryl-piperidine and a therapeutically acceptable acid addition salt thereof.

6. A member selected from the group consisting of the l-1-benzyl-3-benzhydryl-piperidine and a therapeutically acceptable acid addition salt thereof.

References Cited

UNITED STATES PATENTS 2,826,583   3/1958   Hoffman et al. _____ 260—293

HENRY R. JILES, Primary Examiner

G. THOMAS TODD, Assistant Examiner

U.S. Cl. X.R.

260—290, 293.4, 294, 294.7, 296, 297, 326.5, 326.8, 326.85, 326.87, 999

CASE SU-420/1+2

PO-1050
(5/69)

UNITED STATES PATENT OFFICE
CERTIFICATE OF CORRECTION

Patent No. 3,503,983  Dated March 31, 1970

Inventor(s) RENAT HERBERT MIZZONI ET AL

It is certified that error appears in the above-identified patent and that said Letters Patent are hereby corrected as shown below:

Column 10, lines 73-74, "(lower alkyleneimino)-phenyl" should read ---(5 or 6 ring-membered alkyleneimino)-phenyl ---.

Column 11, line 5, the number "5" should be --- 2 ---.

SIGNED AND
SEALED
NOV 17 1970

(SEAL)
Attest:

Edward M. Fletcher, Jr.
Attesting Officer

WILLIAM E. SCHUYLER, JR.
Commissioner of Patents